3,367,740
PROMOTION AGENTS IN THE SULPHATION OF OXIDIZED NICKEL AND COBALT BEARING ORES
Nicolas Zubryckyj, Fort Saskatchewan, Alberta, David J. I. Evans, Edmonton, Alberta, and Vladimir Nicolaus Mackiw, Fort Saskatchewan, Alberta, Canada, assignors to Sherritt Gordon Mines Limited, Toronto, Ontario, Canada, a company
Filed May 6, 1963, Ser. No. 278,266
Claims priority, application Canada, Dec. 13, 1962, 864,450
7 Claims. (Cl. 23—117)

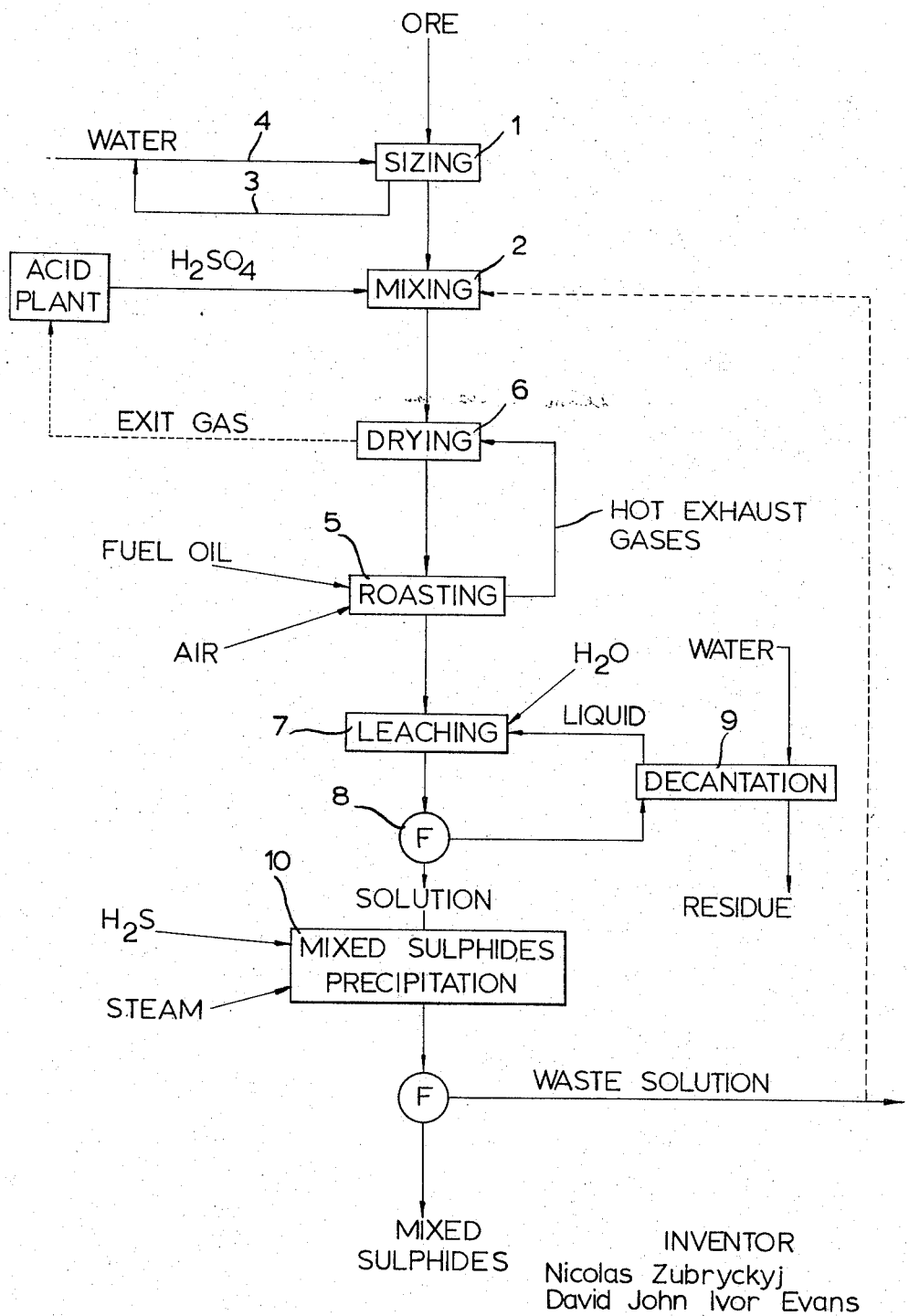

This invention relates to the recovery of nickel and/or cobalt values from oxidized ores and concentrates. More particularly, it relates to improvements which increase the effectiveness and efficiency of sulphation as a means of treating nickeliferous lateritic ores for the recovery of nickel.

The major portion of the world's nickel resources are contained in oxidized ores such as laterites of the limonitic and garnieritic types. Large deposits of these ores are found in Cuba, the Philippines, New Caledonia, Indonesia, and Central and South America. The laterite deposits in Cuba and New Caledonia have long constituted important sources of the world's supply of nickel.

The problems encountered in the treatment of these oxidized ores for the recovery of the contained nickel and cobalt values are well known in the art, as evidenced by the considerable research and large number of patents on the subject. The problems result primarily from the fact that oxidized ores of the lateritic type usually contain only small amounts of nickel, of the order of about 1% nickel and 0.1% cobalt in Cuban and Philippine ores and somewhat higher percentages in New Caledonian ores and they are not amenable to mechanical concentration by known ore benefication procedures. Consequently, large amounts of material must be treated metallurgically for the recovery of the relatively small amounts of desired nickel and/or cobalt values contained therein.

Known processes which have been used with some degree of success to recover nickel and cobalt values from lateritic ores include direct treatment processes such as smelting to produce a ferro-nickel alloy which usually contains some cobalt and a ferro-cobalt alloy which usually contains nickel and hydrometallurgical processes in which the nickel and cobalt values are converted to carbonates or sulphates.

Sulphation processes generally possess an advantage over direct pyrometallurgical procedures in that they permit the recovery of at least part of the nickel and cobalt as marketable, relatively pure metal. However, the known sulphation processes inherently suffer from a number of disadvantages of which the most serious is the high consumption of sulphating agent which usually is sulphuric acid or gaseous sulphur trioxide; extraction and recovery of nickel are generally relatively low, of the order of 75 to 80% or less; if a strong sulphuric acid leach solution and/or high pressures are used, corrosion of equipment presents an important problem; and, also, expensive equipment and complex processing steps are involved.

An improved sulphation process described herein as the "sulphuric acid mixing-roasting" process has been discovered in which these problems are, to a large extent, overcome. This earlier discovered process is directed primarily to the treatment of limonitic laterites which contain at least 25% by weight iron. Very satisfactory nickel and/or cobalt extractions are obtained with a minimum consumption of sulphating agent (sulphuric acid).

Briefly, the earlier discovered sulphation process comprises the steps of intimately mixing finely divided ore with an amount of concentrated sulphuric acid equal to about 30% by weight of the ore; roasting the ore-acid mixture under conditions in which the duration of the roast, the roast temperature and the roast atmosphere are specifically controlled to promote selective sulphation of the nickel and cobalt values while suppressing the formation of iron sulphate; leaching the sulphated nickel and cobalt values from the roasted ore mass with water; and separating the nickel and cobalt values from the leach solution. Nickel recoveries of the order of from 80 to 85% of the nickel contained in the ore can be obtained by the use of this process and, in view of low acid consumption and the simplicity of the overall process, it provides a practical and economical method of treating lateritic ores for the recovery of contained nickel and/or cobalt values. It is, of course, desirable that even higher nickel and cobalt extractions be obtained without increasing the complexity or cost of the overall process, and preferably that this be done while decreasing the overall cost of the process.

It is, therefore, a primary object of the present invention to provide an improved procedure for increasing the nickel extractions that can be obtained by the use of sulphation-roast processes in the treatment of oxidized nickel bearing material. It is also an object of this invention to increase the selectivity of the sulphation process such that the sulphation of the desired nickel and/or cobalt values is promoted, and the sulphation of the other metal values contained in the ore, particularly iron, is suppressed. A further object is to obtain such increased nickel and/or cobalt extractions with improved selectivity in the sulphation step by simple and economic procedures.

An understanding of the above and other objects of the present invention and the manner in which they can be attained can be obtained from the following description and examples.

In essence, the present invention resides in the discovery that the presence of magnesium, sodium and/or potassium ions strongly influence the sulphation characteristics of the metal values contained in oxidized nickel and/or cobalt bearing materials subjected to the sulphation-roast reaction. We have found that magnesium, potassium and sodium compounds will, if provided in the material subjected to sulphation treatment, promote the selective sulphation of nickel and cobalt. In addition, potassium ions and, to a lesser extent, sodium ions, will inhibit or suppress the sulphation of the iron which is present in the material. Thus, one or more of these elements or metal bearing compounds capable of providing these ions can be added to oxidized nickeliferous ore materials, either separately or in various combinations, to promote the sulphation of desired nickel and/or cobalt values and to suppress the sulphation of undesirable iron values with the result that increased extractions of nickel and/or cobalt can be obtained with the consumption of less sulphating agent than would otherwise be required. Also, because these metal ions are effective when provided by the addition of any of their compounds, whether initially water soluble or not, any one or combination of them can be provided from any inexpensive, naturally occuring and readily available source. For example, peridotite, garnierite and serpentine ore can provide a source of magnesium ions and sea water can provide a source of the magnesium, sodium and potassium ions.

The present invention can be utilized to particular advantage in conjunction with the sulphuric acid mixing-roasting sulphation process referred to hereinabove. For explanatory purposes, the present improved process will be described in detail hereinafter as applied to that process with reference to the accompanying flow sheet drawing. It will be understood, of course, that the principles explained herein will be equally applicable to any sulphation process in which the object is to achieve selective sulphation of the nickel and/or cobalt values contained in an iron bearing oxidized material with a minimum accompanying sulphation of the other metal constituents of the ore, particularly the iron constituent. It will also be understood that the expression "promotion agent" used hereinbelow, will include magnesium, potassium and sodium in their several compound forms for the promotion of nickel and cobalt sulphation and the suppression of iron sulphation.

In utilizing this invention to improve the efficiency of the sulphuric acid mixing-roasting process referred to hereinabove, the starting material is subjected to conventional sizing operations in step 1 to enable it to be thoroughly and intimately mixed with sulphuric acid in a mixing or pugging step 2. Preferably, it is sized, such as by a screening and grinding circuit 3, if necessary, so that all particles are smaller than about 1 mm. The ore preferably, but not necessarily, is then mixed with water to produce a slurry comprising about 45% to about 75% solids. The selected promotion agent can be added during the sizing or slurrying operation. The amount and type of promotion agent used is dependent mainly on the operating conditions and the nature of the particular material subjected to sulphation treatment as will become apparent from the following examples. However, a number of general principles have been found applicable in most cases as discussed hereinbelow.

The promotion agents may be supplied by a soluble salt which can be dissolved in and introduced by way of the slurry make-up water 4 or added to the starting ore materials in the sizing step 1. However, in that lateritic ores of secondary hydrous magnesium and nickel-magnesium silicates, such as sepentine and garnierite, and their primary magnesium silicate source minerals such as olivine, pyroxene and amphibole and nickel-bearing peridotite contain available magnesium in the form of water-insoluble magnesium silicate, and in that these secondary and primary silicates are normally found associated with the limonitic laterite ore which is processed for recovery of valuable metals, a promotion agent such as magnesium preferably is provided in the sulphation process by the blending of a magnesium bearing laterite or primiary mineral with the limonitic laterite in the sizing or mixing stages of the process.

In the cases where it may be preferred to employ promotion agents in the form of water soluble compounds such as chlorides and sulphates because high magnesium laterites or magnesium bearing primary minerals are not economically available or because the characteristics of the ore processed require the addition of potassium or sodium compounds in addition to magnesium compounds, we have found the addition of sea water or brackish water containing dissolved salts of magnesium, sodium, potassium and mixtures thereof provide improved nickel and cobalt recoveries from limonitic laterite ores. Also, sodium silicate in water soluble form has been found to substantially increase the nickel and cobalt recovery from limonitic laterite ores. All such materials capable of providing promoting agents under the conditions of the reaction are referred to herein as "addition agents."

The magnesium, potassium and sodium compounds differ in their respective effects in promoting and/or suppressing the sulphation of the metal constituents of a given starting ore material. In general, compounds of all three metals will promote the sulphation of nickel and cobalt, although not necessarily to the same degree. However, we have found that the presence of magnesium compounds has little effect in the suppression of iron sulphation whereas potassium compounds are markedly effective in this respect and sodium ions have an inhibiting effect intermediate between the potassium and magnesium compounds. Also, we have found that, in the presence of magnesium compounds, the sulphation promoting activity of sodium compounds is sharply reduced unless the sodium to magnesium weight ratio in the material treated is above about 1.5. Conversely, magnesium compounds have reduced activating effect in the presence of sodium compounds unless the sodium to magnesium weight ratio is below about 0.5. In other words, sodium and magnesium compounds, when present together, do not have a simple cumulative effect in promoting sulphation of nickel and/or cobalt values. Rather, one will inhibit the promoting activity of the other when sodium and magnesium are present in about equal amounts, by weight, and, as the proportion of one to the other is increased, its promoting activity is gradually restored. For example, at a sodium to magnesium weight ratio of about 5, the promoting activity of the sodium compounds is essentially restored, and at a magnesium to sodium weight ratio of about 5, the sulphation promoting activity of magnesium is essentially restored.

The most suitable promotion agents for a particular material will thus depend primarily on the composition of the ore to be treated and on the availability of addition agents of the class referred to herein. For example, in treating a limonitic lateritic ore having a low, i.e. substantially negligible, magnesium content, any magnesium, potassium or sodium bearing compound may be added to promote the sulphation of the nickel and cobalt contained therein. However, for economic reasons, the most suitable addition agent may be a form of magnesium silicate which comprises a substantial portion of the lateritic serpentine and garnieritic ores and primary source minerals that ordinarily occur in association with limonitic laterite ores. Also, any source of saline or brackish water which contains dissolved salts of magnesium, sodium, potassium or mixtures of all three promoting agents may be used.

Except for the considerations as to the sodium:magnesium weight ratio referred to above, the amount of promoting agent added is not a critical factor. Generally speaking, a small addition of promotion agent, in the order of the equivalent of about 1 to 2% magnesium, sodium and potassium, by weight, of the ore, or less, will give a definite increase in nickel and cobalt sulphation. Where the promotion agent is introduced in the form of a relatively pure salt of potassium, magnesium or sodium, it has been found that there is generally no particular advantage in adding more than the equivalent of about 2.5%, by weight, of the ore of potassium, about 2%, by weight, of magnesium, or about 5%, by weight, of sodium; the quantity of salt introduced being determined by the metal used. However, where the promotion agent is not introduced in the form of relatively pure salt, the amount of promotion agent required will depend primarily on the operating factors and the purity of the particular addition agents used. For example, it may be desirable to provide more than the equivalent of about 2%, by weight, of magnesium when it is supplied by way of the addition of garnieritic ores. Thus, the upper limit for the amount of promotion agent introduced must be determined for each particular case with consideration to economic factors, operating conditions and the form of the addition agent and its purity.

When the promotion agents have been added in suitable quantities to the ore-water slurry, the resultant slurry can be treated generally in accordance with the sulphuric acid mix-roasting process referred to above. Concentrated sulphuric acid is added to the ore in the mixing stage 2 in amount at least sufficient to combine with the nickel, cobalt, manganese and magnesium values as sulphates and, usually, from about 5% to about 40% in excess of this amount. The amount of excess acid is dependent on the composition of the ore subjected to treatment, the composition of the material bearing the promoter agent and, in particular, is related to the amount of other non-ferrous metal values present in the ore and promoter carrier in addition to the nickel, cobalt and manganese. Lateritic ores generally vary considerably in composition, depending on their source and geological history. In particular, the magnesium and aluminum contents vary considerably in different types of ores. For example, the magnesium content may vary between about 0.5% and 10% and the aluminum content between about 1% and 5%. Because of the variations in the compositions of the ores and because the metal values are present in the ores in very complex forms, it is not possible to predict exactly the amount of sulphuric acid which will be required for a specific ore. However, this can be determined quite readily for optimum results by one skilled in the art. The minimum is that required to combine as sulphates with the nickel, cobalt, manganese and magnesium contents of the ore. Any additional amount required to obtain optimum results in the heating step can be determined readily. In general, the total acid requirement is within the broad range of from about 10% to about 60% by weight of the ore and, usually, is between about 20% to about 30% by weight of the ore.

The mixing step 2 can be conducted in a conventional device such as a blender or pug mill. Mixing is continued to obtain optimum distribution of acid throughout the mixture. Additional water can be added during mixing if required to control the consistency of the mass.

The temperature at which the mixing step is conducted is not critical. We have found that excellent results are obtained when it is conducted at the temperature which is produced autogenously by the exothermic reaction of the ore and acid, usually from about 90° C. to about 140° C.

The acidified mixture can be passed directly to the roasting furnace 5. Alternatively, it can be dried either by permitting it to become dry in the latter stages of the mixing step by omitting the water additions, or by drying it in a conventional drier 6, such as a heated, rotary kiln. The dried material may be crushed prior to passing it to the heating furnace; however, the most satisfactory results are obtained from the roasting step when the ore particles are in a uniformly sized, coarse particulate form rather than a finely divided form. For example, nickel extractions of 82.9% of contained nickel have been obtained when the average particle size of the partially sulphated material fed to the roasting step was about 0.2 mm. in size. Extractions of 93.4% nickel have been obtained from the same starting material when the particle size of the partially sulphated material fed to the roasting step 5 was substantially within the size range of from 1.5 mm. to 5.0 mm. Thus, it is preferred to conduct the mixing step, such as by the controlled addition of water during mixing, so that the ore-acid mixture passed to the roasting step is composed of relatively coarse and evenly sized pellets of ore.

The partially sulphated, dried ore particles or pellets pased to the roasting stage 5 are heated at a tempeature within the range of from about 500° C. to about 725° C. and, preferably, from about 650° C. to about 700° C. The latter temperature range is preferred in that the rate of reaction is more rapid relative to the rate of reaction at lower temperatures resulting in a reduction in the quantity of soluble iron remaining in the roasted ore. The heating step can be conducted in a conventional ore roasting furnace, such as a multiple hearth furnace or a kiln, in which the temperature can be closely controlled. Heat can be supplied by direct combustion of fuel inside the furnace or by external heating.

The time of the heating step depends on the temperature at which it is conducted. That is, the rate of sulphation is increased as the temperature is increased towards the maximum temperature of about 725° C. The heating is continued at the selected temperature until optimum sulphation of the desired non-ferrous metals is obtained. The length of time required to obtain optimum sulphation at any selected temperature within the recommended range is dependent on many factors, such as, for example, the nature of the ore subjected to treatment, the particle size of the material, the type and size of equipment used, and the amount of excess acid used. However, we have found that, in general, it is desirable to continue the heating for a period of time sufficient to produce an iron to nickel ratio in the water leach solution below at least 5:1, and preferably below at least 1:1. The heating step preferably is continued to produce a water soluble iron sulphate to nickel sulphate ratio in the calcine less than about 5:1. In most cases, optimum sulphation is obtained in from about 1 minute to about 20 minutes at 700° C. or from about 60 minutes to about 120 minutes at 600° C. The heating step can be conducted on a batch or a continuous basis.

The roasting can be carried out in a neutral, slightly reducing or oxidizing atmosphere, although a neutral or a slightly oxidizing atmosphere is preferable. It is also advantageous to roast under a slight over-pressure of roast gases, or to recycle roast gases, or both.

There may be agglomeration of sulphated particles in the roasting step. These agglomerates or lumps are easily disintegrated and, accordingly, they can be passed as such directly to leaching step 7.

The sulphated particles are dispersed in water in leaching step 7 to form a slurry which contains, preferably, from about 25% to about 60% solids, by weight. The temperature at which leaching is conducted is not critical. Usually, it is conducted below 100° C. to avoid the necessity of conducting it in a pressure vessel, such as within the range of from about 20° C. to 95° C. A satisfactory leaching rate is obtained within the range of from about 50° C. to about 90° C. Under these conditions, essentially all soluble nickel, cobalt and manganese, if present, contained in the roasted ore are extracted and dissolved in the leach solution, along with some of the soluble magnesium and aluminum. Also, a small part of the iron, less than about 10% and usually from about 1% to about 5%, contained in the starting material is dissolved in the leach solution. The leaching rate is rapid and usually is complete within about 30 minutes retention time.

Undissolved residue is separated from the leach solution by a conventional liquid-solids separation 8, such as filtration. If desired, undissolved residue can be washed with water in a decantation step 9 from which slurry can be discharged from the process and the wash water passed to the leaching step.

The leach solution containing the dissolved nickel and cobalt values is passed to the sulphide precipitation step 10 wherein it is reacted with a sulphidizing agent, such as hydrogen sulphide or other soluble sulphide compounds, mixtures of elemental sulphur and sulphur dioxide, or iron and elemental sulphur, preferably at elevated temperature and pressure, to effect the precipitation of the dissolved nickel and cobalt as sulphides.

In using hydrogen sulphide as the sulphidizing agent in this sulphide precipitation step, optimum results are obtained when the solution has a pH value of from about pH 1 to about pH 3 and it is conducted at a temperature within the range of from about 60° C. to about 150° C. and under a partial pressure of hydrogen sulphide above about 25 pounds per square inch. A nucleation agent, such as in the form of finely divided, previously precipitated metal sulphides, can be provided in the solution subjected to treatment to promote the initiation of the sulphidizing reaction.

The precipitated sulphides are separated from the treated solution, such as by filtration 11 and treated by known methods for the separate recovery of the nickel and cobalt values as product metals. The stripped leach solution, containing dissolved salts of the promotion agents, can be recycled, if desired, to provide continuous utilization of the promotion agents.

The following examples illustrate the manner in which the present invention can be utilized. The tests were conducted in accordance with the steps of the sulphuric acid mix-roast sulphation procedure outlined hereinabove.

The Philippine and New Caledonian limonitic laterite ores and the Philippine weathered serpentine ore used in the tests analyzed as follows:

| Constituent | Percent by Weight | | |
|---|---|---|---|
| | Philippine Limonitic Laterite | Weathered Philippine Serpentine | New Caledonian Limonitic Laterite |
| Ni | 1.20 | 1.48 | 1.40 |
| Co | 0.12 | 0.03 | 0.26 |
| Fe | 48.0 | 12.4 | 45.1 |
| Mg | 0.3 | 17.5 | 0.30 |
| Al | 3.5 | 1.3 | 2.22 |
| Cr | 2.3 | 0.87 | 2.25 |
| Mn | 0.84 | 0.19 | 1.14 |
| $SiO_2$ | 2.0 | 32.4 | 9.21 |
| $S_t$ | 0.17 | 0.1 | 0.37 |
| Cu | 0.015 | N.A. | 0.005 |
| Ca | 0.01 | 0.1 | 0.01 |
| Na | 0.005 | N.A. | 0.005 |
| Ignition loss | 13.2 | 15.5 | 11.5 |

For all tests, the ore was dried at 110°C., ground and screened to a particle size smaller than 0.15 microns. 100 grams of ore were used for each test and 80 ml. of water were used to moisten each sample during pugging. The samples in each case were mixed for 15 minutes with the amount of acid shown. The acid ore mixture was then dried at 110° C., crushed to about 1 cm. in size and roasted in an open atmosphere for the time periods shown. The roasted ore-mass was pulverized and leached in water at 80° C. for 30 minutes. The residues and leach solutions were analyzed to provide the results as tabulated below.

Examples 1a and 1b show the increased nickel extractions which can be obtained when the magnesium ions are supplied by the addition of a high magnesium weathered serpentine ore. The results indicate maximum benefit obtained with an addition of magnesium in an amount of about 2% by weight of the ore. Further additions of magnesium provide no appreciable benefit. It also can be noted in Tables 1 and 2 that extractions are adversely affected by additions of this ore in excess of 30%, by weight, because of the increased consumption of sulphuric acid by the excess of magnesium.

EXAMPLE 1.—EFFECT OF MAGNESIUM SILICATE AS ADDITION AGENT (CONTAINED IN WEATHERED SERPENTINE)

(a) Philippine Limonitic Laterite:
$H_2SO_4$, 30% by weight of ore.
Roasting temperature, 700° C.
Roasting time, 15 minutes.
Preheating time, 8 minutes.

TABLE 1

| Ore Composition | | Total Mg., percent | Nickel in residue, percent | | Extractions, percent | | Fe/Ni in solution |
|---|---|---|---|---|---|---|---|
| Philippine Limonitic Laterite, percent | Weathered Philippine Serpentine, percent | | Before Water Leach | After Water Leach | Ni | Co | |
| 100 | 0 | 0.3 | 1.2 | 0.47 | 68.2 | 86.6 | 3.3 |
| 90 | 10 | 1.75 | 1.2 | 0.29 | 82.0 | 89.0 | 1.88 |
| 70 | 30 | 5.5 | 1.2 | 0.31 | 82.0 | 86.0 | 1.04 |
| 60 | 40 | 7.3 | 1.3 | 0.41 | 76.4 | 72.0 | 0.82 |
| 50 | 50 | 8.9 | 1.3 | 1.2 | 30.0 | 30.0 | 0.03 |

(b) New Caledonia Limonitic Laterite:
$H_2SO_4$, 30% by weight of ore.
Roasting temperature, 700° C.
Roasting time, 15 minutes.
Preheating time, 8 minutes.

TABLE 2

| Ore Composition | | Total Mg., percent | Nickel in residue, percent | | Extractions, percent | | Fe/Ni in solution |
|---|---|---|---|---|---|---|---|
| New Caledonian Limonitic Laterite, percent | Weathered Philippine Serpentine, percent | | Before water leach | After water leach | Ni | Co | |
| 100 | 0 | 0.3 | 1.4 | 0.40 | 78.0 | 85.5 | 2.46 |
| 90 | 10 | 1.75 | 1.4 | 0.29 | 84.2 | 84.9 | 1.8 |
| 80 | 20 | 3.50 | 1.4 | 0.30 | 84.0 | 80 | 1.6 |
| 70 | 30 | 5.5 | 1.4 | 0.29 | 84.6 | 78 | 0.94 |
| 60 | 40 | 7.3 | 1.4 | 0.39 | 79.5 | 74.4 | 0.55 |
| 50 | 50 | 8.9 | 1.4 | 0.91 | 52.4 | 55.8 | 0.14 |

EXAMPLE 2.—EFFECT OF SODIUM BEARING COMPOUNDS AS PROMOTION AGENTS

Philippine Limonitic Laterite Ore:
   $H_2SO_4$, 30% by weight of ore.
   Roasting temperature, 700° C.
   Roasting time, 15 minutes.

TABLE 3

| Addition Agent, Percent by weight of ore | Preheating time, minutes | Percent Ni in residue | | Extractions, Percent | | Fe/Ni in solution |
|---|---|---|---|---|---|---|
| | | Before water leach | After water leach | Ni | Co | |
| Na as $Na_2SiO_3$: 4% | 8 | 1.2 | 0.19 | 87.0 | 88.5 | 2.19 |
| Na as NaCl: | | | | | | |
| 2% | 10 | 1.2 | 0.24 | 85.0 | 84.3 | 1.67 |
| 2% | 15 | 1.2 | 0.21 | 86.5 | 91.5 | 1.08 |
| Na as $Na_2SO_4$: | | | | | | |
| 0 | 8 | 1.2 | 0.47 | 68.2 | 86.6 | 3.3 |
| 0.65% | 8 | 1.2 | 0.41 | 73.0 | 83.5 | 2.1 |
| 1.6% | 8 | 1.2 | 0.16 | 90.0 | 92.0 | 2.68 |
| 1.6%[1] | 8 | 1.2 | 0.20 | 86.5 | 90.0 | 1.8 |
| 1.6%[2] | 8 | 1.2 | 0.19 | 87.4 | 93.0 | 2.1 |
| 3.2% | 8 | 1.2 | 0.15 | 90.6 | 93.5 | 3.2 |
| 4.9% | 8 | 1.2 | 0.16 | 90.0 | 92.7 | 3.3 |

[1] 20% sulphuric acid by weight added in this case.
[2] 25% sulphuric acid by weight added in this case.

The results shown in Example 2 clearly demonstrate the beneficial effect of the addition of sodium compounds in the extraction of nickel and cobalt from Philippine limonitic lateritic ores. The results show that the maximum useful sodium addition for this ore is about 4%, by weight, of the ore. The results also show that the acid requirements for optimum sulphation can be substantially reduced by the use of promoting agents. Equally improved results were obtained in treating New Calendonian limonitic laterite. Nickel extractions of 93.5% were obtained with the addition of 3.2%, by weight, Na added as $Na_2SO_4$.

EXAMPLE 3.—EFFECT OF POTASSIUM SULPHATE AS ADDITION AGENT (a) Philippine Limonitic Laterite ore:
   $HS_2O_4$, 30% by weight ore.
   Roasting temperature, 700° C.
   Roasting time, 15 minutes.
   Preheating time, 8 minutes.

TABLE 4

| K as $K_2SO_4$, percent by wt. ore | Ni in residue, percent | | Extractions, percent | | Fe/Ni in sol. |
|---|---|---|---|---|---|
| | Before water leach | After water leach | Ni | Co | |
| 0 | 1.2 | 0.47 | 68.2 | 86.6 | 3.3 |
| 0.22 | | 0.37 | 75.3 | 83.4 | 1.9 |
| 0.44 | 1.2 | 0.43 | 70.2 | 83.4 | 0.84 |
| 0.9 | | 0.46 | 68.2 | 83.5 | 0.87 |
| 4.4 | | 0.46 | 68.0 | 80.2 | 0.95 |

EXAMPLE 3—Continued (b) Mixture of 70% New Caledonian Limonitic Laterite and 30% Philippine Serpentine ores:
   $H_2SO_4$, 30% by weight of ore.
   Roasting temperature, 700° C.
   Roasting time, 15 minutes.
   Preheat time, 8 minutes.
   Total Mg., 5.5%.

TABLE 5

| K as $K_2SO_4$ percent by weight of ore | Extractions, percent | | Fe/Ni |
|---|---|---|---|
| | Ni | Co | |
| 0 | 83.5 | 78 | 0.94 |
| 0.22 | 86 | 79.6 | 0.90 |
| 0.9 | 86.6 | 81.1 | 0.70 |
| 2.2 | 83 | 83.8 | 0.45 |

The results shown in Examples 3a and 3b illustrate that the addition of a very small amount of potassium compound will have a beneficial effect on nickel extraction. However, the most striking effect of the potassium addition is its suppression of the solubility of iron as is indicated by the Fe to Ni ratios in Tables 4 and 5. Table 5 also illustrates the cumulative effect of additions of both potassium and magnesium ions, the magnesium being provided by the serpentine.

EXAMPLE 4.—INFLUENCE OF MIXTURES OF MAGNESIUM, SODIUM AND POTASSIUM BEARING COMPOUNDS ON THE SULPHATION OF Ni AND Co:

Philippine Limonitic Laterite:
   Addition agents, $MgSO_4$, $K_2SO_4$ and $Na_2SO_4$.
   $H_2SO_4$, 30% by weight of ore.
   Roasting temperature, 700° C.
   Roasting time, 15 minutes.
   Preheating time, 8 minutes.

TABLE 6

| Na as $Na_2SO_4$ | Mg as $MgSO_4$ Percent by weight ore | K as $K_2SO_4$ | Na:Mg weight Ratio | Percent Ni in residue After water leach | Extractions, Percent | | Fe:Ni in solution |
|---|---|---|---|---|---|---|---|
| | | | | | Ni | Co | |
| 0 | *0 | 0 | --- | 0.47 | 68.2 | 86.6 | 3.3 |
| 1.6 | *0 | 0 | 5.3 | 0.16 | 90.0 | 92.0 | 2.68 |
| 1.6 | 1.0 | 0 | 1.2 | 0.30 | 80.0 | 84.2 | 2.95 |
| 1.6 | 3.0 | 0 | 0.48 | 0.24 | 84.7 | 89.2 | 4.1 |
| 4.9 | 1.0 | 0 | 3.8 | 0.16 | 90.0 | 93.0 | 3.74 |
| 0 | 1.0 | 0 | --- | 0.30 | 80.3 | 88.3 | 2.73 |
| 0 | 1.0 | 0.9 | --- | 0.23 | 85.0 | 86.3 | 0.82 |

*0.3% Mg present in the starting material.

The results of Example 4, Table 6, illustrate the non-cumulative sulphation promoting activity of combined sodium and potassium compound additions. It will be noted that a nickel extraction of 90.0% was obtained with the addition of 1.6 weight percent Na+, as Na$_2$SO$_4$ which gave a Na to Mg weight ratio of 5.3. The addition of 1.0 weight percent Mg++, as MgSO$_4$, yielding a Na:Mg weight ratio of 1.2 reduced the nickel extraction to 80.0%. As the Mg++ was increased to give a Na to Mg weight ratio of 0.48, the nickel extraction was increased to 84.7%. A very small amount of potassium, 0.9% by weight of the ore, along with 1.0%, by weight, magnesium addition, not only increases nickel extraction but also produces a striking reduction in soluble iron, the Fe:Ni ratio in solution being reduced from 2.73 to 0.82.

EXAMPLE 5.—EFFECT OF USING SEA WATER AS A SOURCE OF Mg++, Na+ AND K+—NEW CALEDONIAN LIMONITIC LATERITE 60, 120 and 180 ml. of synthetic sea water were used in admixture with 100 gram samples of ore:
H$_2$SO$_4$+30% by weight of ore
Roasting Temperature, 700° C.
Composition of the synthetic sea water was: Na, 11.33 g.p.l., Equiv. of 2 gm. sodium sulphate in a 60 ml. volume; Mg, 1.33 g.p.l.; Ca, 0.42 g.p.l.; K, 0.4 g.p.l.; CO$_2$, 0.11 g.p.l.; Br, 0.07 g.p.l.; S(SO$_4$), 0.192 g. p.l.; Cl, 19.85 g.p.l.

TABLE 7

| Amount of water used, ml. | Weight of ore, gm. | Preheating time, mins. | Roasting time, mins. | Percent Ni in residue | | Extractions, percent | |
|---|---|---|---|---|---|---|---|
| | | | | Before water leach | After water leach | Ni | Co |
| 60 ordinary water | 100 | 13 | *0 | 1.4 | 0.48 | 74.6 | 78.4 |
| 60 sea water | 100 | 12.5 | *0 | 1.4 | 0.35 | 80.5 | 84.6 |
| 120 sea water | 100 | 6½ | 15 | 1.4 | 0.29 | 84.0 | 90.7 |
| 180 sea water | 100 | 8½ | 15 | 1.4 | 0.19 | 88.4 | 89.5 |

* Roasting was discontinued when roast temperature was reached.

These results show the beneficial effect produced by the addition of magnesium, sodium and potassium contained in sea water. When the concentration of these metal ions is increased, the extraction of nickel and cobalt is increased to almost 90%.

The present invention possesses a number of important advantages in the treatment of nickeliferous laterite ores. Extractions of nickel and cobalt at levels heretofore unobtainable are permitted with the use of a minimum amount of sulphating agent. The problem of excessive sulphation of iron is substantially minimized thus yielding a leach solution which is low in iron content and from which high grade nickel and cobalt sulphides can be directly recovered without the need for iron removal prior to precipitation of nickel and cobalt sulphides. In addition, the teachings of the present invention permit the advantageous use of inexpensive and readily available materials as a source of sulphation promotion agents, such as, for example, high magnesium serpentine and garnieritic ores and sea water.

It will be understood, of course, that modifications of the preferred embodiment of the invention described and illustrated herein can be made without departing from the scope of the invention defined by the appended claims.

What we claim as new and desire to protect by Letters Patent of the United States is:

1. A process for the treatment of nickel and cobalt bearing ores of the limonitic laterite type which contain negligible magnesium and at least about 25% iron by weight which comprises the steps of:
   (a) mixing the ore in particulate form with sulphuric acid provided in an amount at least sufficient to combine with the nickel, cobalt, manganese and magnesium contents of the ore as sulphates but no more than 40% in excess of such amount;
   (b) providing in the acid-ore mixture as a nickel and cobalt sulphation promotion agent, an inorganic substance which will supply to said mixture during heating step (c) ions selected from the group consisting of magnesium ions, potassium ions, sodium ions and mixtures thereof in amount sufficient to promote the selective sulphation of nickel and cobalt;
   (c) heating the acid-ore mixture at a temperature within the range of from about 500° C. to about 725° C.;
   (d) continuing the heating step until the weight ratio of iron sulphate to nickel sulphate in the roasted ore is below about 5:1;
   (e) leaching the roasted ore with an aqueous solution to extract and dissolve nickel and cobalt sulphates.

2. The process as claimed in claim 1 in which the promotion agent is provided in an amount sufficient to supply from about 1.0 to about 2.0% magnesium by weight of the ore, from about 1.0 to about 5.0% sodium by weight of the ore and from about 0.22 to about 0.9% potassium by weight of the ore where the ions supplied are magnesium, sodium and potassium, respectively.

3. The process according to claim 1 in which from about 1.0 to about 2.5% potassium by weight of the ore is supplied in the acid-ore mixture to suppress the sulphation of iron during the heating step (c).

4. The process as claimed in claim 1 in which the promotion agent is a member selected from the group consisting of hydrated magnesium silicates, magnesium sulphate, magnesium chloride, sodium silicates, sodium sulphate, sodium chloride, potassium sulphate, potassium chloride and mixtures thereof.

5. The process according to claim 4 in which the added substance is a mixture of magnesium, sodium and potassium chlorides provided in the form of sea water.

6. The process according to claim 1 wherein both magnesium ions and sodium ions are supplied to the acid-ore mixture and the relative amount of each is adjusted such that the sodium to magnesium weight ratio in said mixture is below 0.5.

7. The process according to claim 1 wherein both magnesium ions and sodium ions are supplied to the acid-ore mixture and the relative amount of each is adjusted such that the sodium to magnesium weight ratio in said mixture is above 1.5.

References Cited

UNITED STATES PATENTS

| | | | |
|---|---|---|---|
| 1,075,409 | 10/1913 | Dekker | 75—115 |
| 2,775,517 | 12/1956 | Mancke | 75—119 X |
| 2,776,207 | 1/1957 | Mancke | 75—115 |
| 2,899,300 | 8/1959 | Bailey | 75—115 X |
| 2,971,835 | 2/1961 | Matson | 75—115 |
| 3,093,559 | 6/1963 | White et al. | 75—115 X |
| 3,130,043 | 4/1964 | Lichty | 75—115 |

MILTON WEISSMAN, *Primary Examiner.*

OSCAR R. VERTIZ, *Examiner.*

B. H. LEVENSON, *Assistant Examiner.*